(12) United States Patent
Ishida (10) Patent No.: US 8,204,616 B2
(45) Date of Patent: Jun. 19, 2012

(54) DATA OUTPUT APPARATUS AND DATA OUTPUT METHOD

(75) Inventor: Fumitoshi Ishida, Kanagawa (JP)

(73) Assignee: Sony Corporation, Tokyo (JP)

( * ) Notice: Subject to any disclaimer, the term of this patent is extended or adjusted under 35 U.S.C. 154(b) by 920 days.

(21) Appl. No.: 12/237,642

(22) Filed: Sep. 25, 2008

(65) Prior Publication Data

US 2009/0093895 A1    Apr. 9, 2009

(30) Foreign Application Priority Data

Oct. 9, 2007    (JP) .................................. 2007-263620

(51) Int. Cl.
*G06F 17/00* (2006.01)
(52) U.S. Cl. ....................................................... 700/94
(58) Field of Classification Search .................... 700/94; 725/30, 117
See application file for complete search history.

(56) References Cited

U.S. PATENT DOCUMENTS

2006/0053441 A1*    3/2006    Walker .......................... 725/30

OTHER PUBLICATIONS

SMPTE Standard for Digital Television Tape REcording—12.65mm Type D-16 Format; SMPTE 409M-2005; Feb. 15, 2005.*
SMPTE 372M Proposed SMPTE Standard for Television—Dual Link 292M Interface for 1920X1080 Picture Raster.

* cited by examiner

*Primary Examiner* — Andrew C Flanders
(74) *Attorney, Agent, or Firm* — Wolf, Greenfield & Sacks, P.C.

(57) ABSTRACT

A data output apparatus is provided. The data output apparatus includes a playback unit and an audio processing unit. The playback unit carries out playback of data at 2× speed from a tape-shaped recording medium, on which has been recorded video data with a field frequency of 59.94 Hz and audio data with a sampling frequency of 48 kHz, by playing back video data in odd-numbered fields and audio data corresponding thereto and video data in even-numbered fields and audio data corresponding thereto in parallel. The audio processing unit writes the audio data corresponding to the odd-numbered fields and the audio data corresponding to the even-numbered fields played back in parallel in the playback unit into a memory, reads out the audio data from the memory at 96 kHz in order of the corresponding fields, and outputs the audio data to dual-link HD-SDI transmitters.

24 Claims, 12 Drawing Sheets

DATA OUTPUT APPARATUS AND DATA OUTPUT METHOD

CROSS REFERENCES TO RELATED APPLICATIONS

The present invention contains subject matter related to Japanese Patent Application JP 2007-263620 filed in the Japanese Patent Office on Oct. 9, 2007, the entire contents of which being incorporated herein by reference.

BACKGROUND OF THE INVENTION

1. Field of the Invention

The present invention relates to a data output apparatus and data output method when playing back data at 2× speed in VTRs.

2. Description of the Related Art

HDCAM SR® format that has been proposed by the present applicant is a VTR format compliant with full high vision video with a resolution of 1920H×1080V. According to HDCAM SR® format, a recording region for video data of one field is divided into a start region and an end region of each track and a recording region for audio data of one field is provided in between such regions. The sampling frequency of the audio data is 48 kHz. Twelve channels are provided for audio data, and data on the first channel to the twelfth channel is recorded in that order in the recording region for audio data of one field.

When recording video data with a field frequency of 59.94 Hz, the sampling rate of the audio data is not an integer multiple of the field frequency and the number of samples of audio data in one field is calculated as (1/59.94 Hz)/(1/48 kHz)=800.8.

Figure 1:
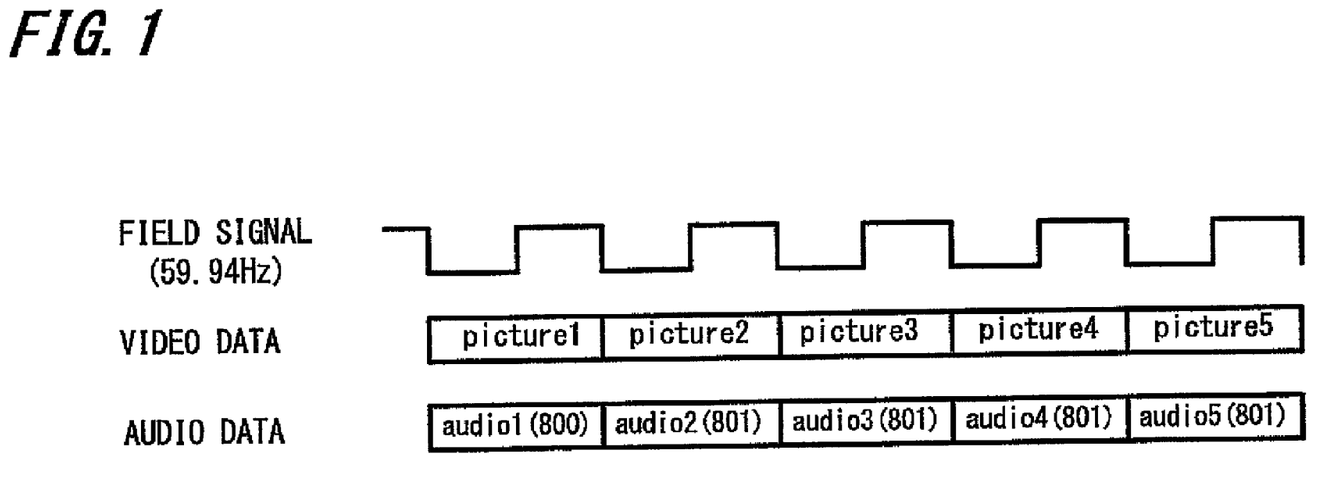
FIG. 1 is a diagram showing the number of recording samples of audio data in each field when the field frequency is 59.94 Hz.

As shown in FIG. 1, in such a case, data is handled in units of five consecutive fields and "audio1(800)" with 800 samples is recorded corresponding to the video data "picture1" of the first field and audio data "audio2(801)" to "audio5(801)" that each have 801 samples are recorded corresponding to the video data "picture2" to "picture5" of the second to fifth fields.

Figure 2:
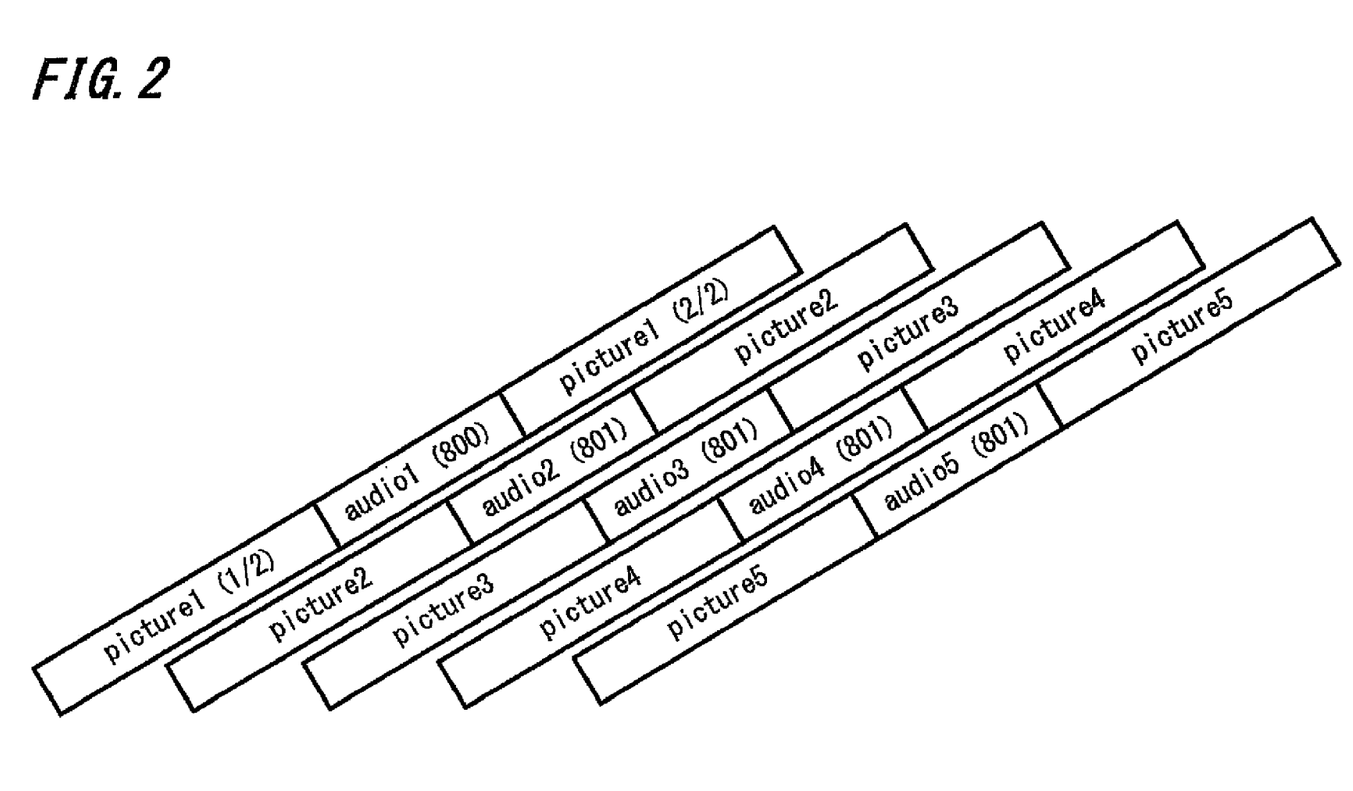
FIG. 2 is a diagram showing the recording positions of the video data and audio data shown in FIG. 1 on a magnetic tape.

FIG. 2 is a diagram showing the recording positions of the video data "picture1" to "picture5" and the audio data "audio1(800)" to "audio5(801)" on a magnetic tape. The video data "picture1" of the first field is divided into the start region and end region of the track (the divided two pieces of video data are indicated in FIG. 2 as "picture1 (1/2)" and "picture1 (2/2)") and the audio data "audio1(800)" is recorded in the space between such regions. The same also applies to the second to fifth fields. Note that although the case where the video data of one field is recorded on only one track is shown for convenience in FIG. 2, the video data of one field is actually recorded using twelve tracks.

Although not shown in FIG. 2, start signals showing the start of data are recorded before the respective recording positions of the video data "picture1" to "picture5" (i.e., at the first positions read by a magnetic head). Also, "5-field" IDs that identify the ordinal positions of the respective audio data that form a five-field unit are recorded before the respective recording positions of the audio data "audio1(800)" to "audio5(801)", thereby making it possible to identify whether the respective audio data have 800 or 801 samples. Such "5-field" IDs take the values 0 to 4. with the value 0 showing the audio data corresponding to the first field where the number of samples is 800 and the values 1, 2, 3. and 4 showing the audio data corresponding to the second, third, fourth, and fifth fields where the number of samples is 801.

According to HDCAM SR® format, 1× speed mode (where the data rate of video data is 440 Mbps) and 2× speed mode (where the data rate of video data is 880 Mbps) are supported as recording and playback modes. Accordingly, it is possible to play back data, which was recorded at 1× speed, at 1× speed and also possible to play back data, which was recorded at 1× speed, at 2× speed.

1× Speed Playback

Figure 3:
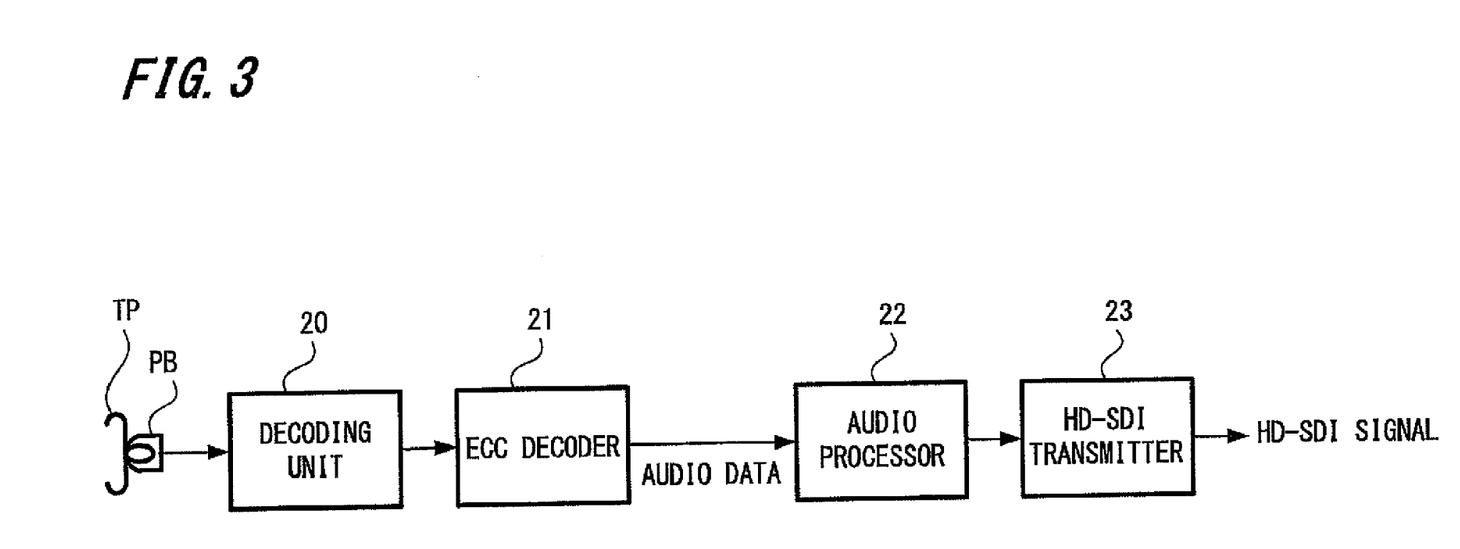
FIG. 3 is a block diagram showing an audio data output system when playing back data at 1× speed.

FIG. 3 is a block diagram showing an output system for audio data in an HDCAM SR®-format video tape recorder where video data with a field frequency of 59.94 Hz is played back at 1× speed and transmitted as an HD-SDI signal according to SMPTE 292M. After waveform shaping and a decoding process have been carried out in a decoding unit 20 on the signal read out from a magnetic tape TP by a playback head PB, error correction is carried out in a ECC decoder 21. Subsequently, audio data that has been subjected to error correction is outputted from the ECC decoder 21 to an audio processor 22.

The audio processor 22 outputs the audio data to an HD-SDI transmitter 23 as audio data to be embedded in video data.

Figure 4A:
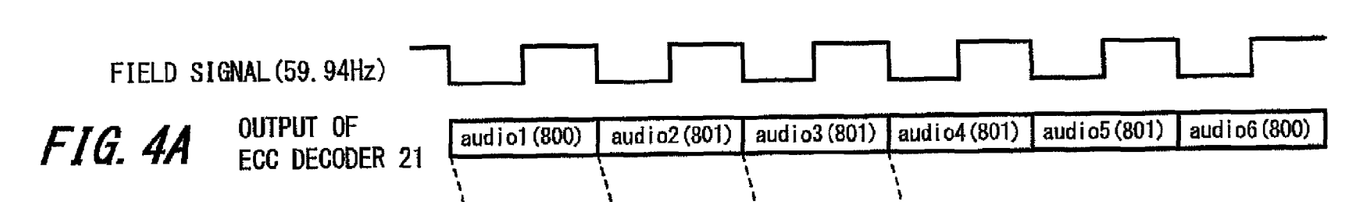
FIGS. 4A and 4B are diagrams showing audio data outputted from the ECC decoder and HD-SDI transmitter shown in FIG. 3.
Figure 4B:
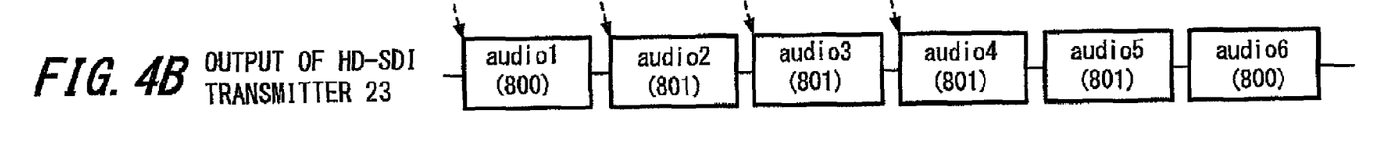

FIGS. 4A and 4B are diagrams showing audio data outputted from the ECC decoder 21 and audio data outputted from the HD-SDI transmitter 23. As shown in FIG. 4A, audio data that was consecutive in the original audio, such as "audio1(800)", "audio2(801)", "audio3(801)", "audio4(801)", "audio5(801)", . . . is outputted from the ECC decoder 21 to the audio processor 22.

The audio processor 22 outputs such audio data in the same order of "audio1(800)", "audio2(801)", "audio3(801)", "audio4(801)", "audio5(801)", . . . to the HD-SDI transmitter 23. As shown in FIG. 4B, although the audio data outputted from the HD-SDI transmitter 23 is embedded into spaces between the video data and therefore appears to be divided into field units, the data is still consecutive in the original order of "audio1(800)", "audio2(801)", "audio3(801)", "audio4(801)", "audio5(801)", . . . .

Figure 5:
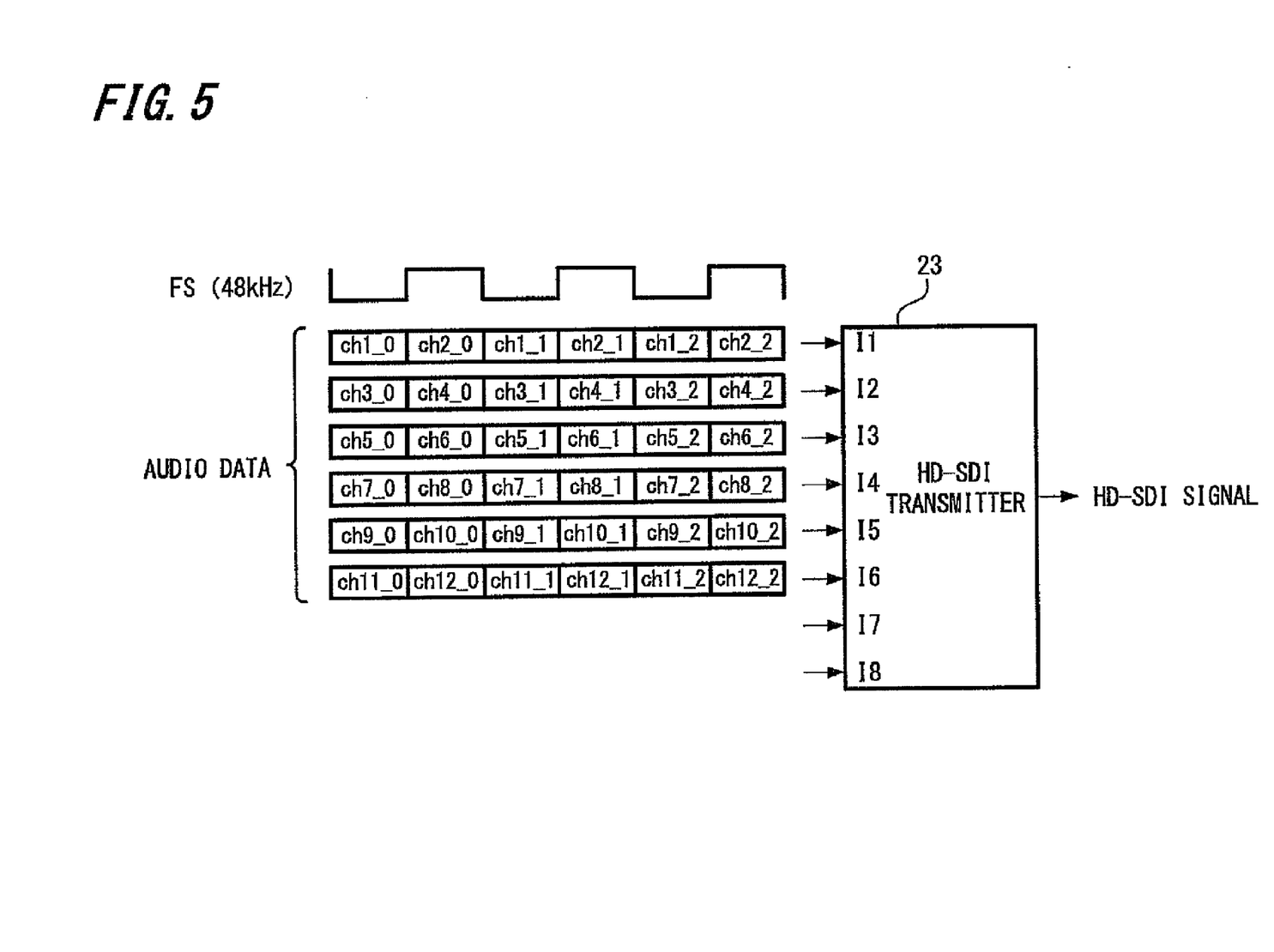
FIG. 5 is a diagram showing details of the channels of audio data outputted from the audio processor shown in FIG. 3.

FIG. 5 is a diagram showing details of the channels of audio data outputted from the audio processor 22. Here, it is possible to embed sixteen channels of audio data in an HD-SDI signal. The HD-SDI transmitter 23 is therefore provided with eight input terminals I1 to I8 for inputting sixteen channels of audio data. The audio processor 22 outputs audio data on two channels in each sampling period to six input terminals I1 to I6 out of the eight input terminals.

Specifically, the audio processor 22 outputs the audio data as shown below to the input terminals I1 to I6 in a given sampling period SC1.

ch1_0 that is part of the data on channel ch1 and ch2_0 that is part of the data on channel ch2 are outputted to the input terminal I1.

ch3_0 that is part of the data on channel ch3 and ch4_0 that is part of the data on channel ch4 are outputted to the input terminal I2.

ch5_0 that is part of the data on channel ch5 and ch6_0 that is part of the data on channel ch6 are outputted to the input terminal I3.

ch7_0 that is part of the data on channel ch7 and ch8_0 that is part of the data on channel ch8 are outputted to the input terminal I4.

ch9_0 that is part of the data on channel ch9 and ch10_0 that is part of the data on channel ch10 are outputted to the input terminal I5.

ch11_0 that is part of the data on channel ch11 and ch12_0 that is part of the data on channel ch12 are outputted to the input terminal I6.

The audio processor 22 outputs the following audio data to the input terminals I1 to I6 in the next sampling period SC2.

ch1_1 that follows ch1_0 in the data on channel ch1 and ch2_1 that follows ch2_0 in the data on channel ch2 are outputted to the input terminal I1.

ch3_1 that follows ch3_0 in the data on channel ch3 and ch4_1 that follows ch4_0 in the data on channel ch4 are outputted to the input terminal I2.

ch5_1 that follows ch5_0 in the data on channel ch5 and ch6_1 that follows ch6_0 in the data on channel ch6 are outputted to the input terminal I3.

ch7_1 that follows ch7_0 in the data on channel ch7 and ch8_1 that follows ch8_0 in the data on channel ch8 are outputted to the input terminal I4.

ch9_1 that follows ch9_0 in the data on channel ch9 and ch10_1 that follows ch10_0 in the data on channel ch10 are outputted to the input terminal I5.

ch11_1 that follows ch11_0 in the data on channel ch11 and ch12_1 that follows ch12_0 in the data on channel ch12 are outputted to the input terminal I6.

In the same way, in each sampling period, data on the channels ch1 and ch2 is outputted as a unit to the input terminal I1, data on the channels ch3 and ch4 is outputted as a unit to the input terminal I2, data on the channels ch5 and ch6 is outputted as a unit to the input terminal I3, data on the channels ch7 and ch8 is outputted as a unit to the input terminal I4, data on the channels ch9 and ch10 is outputted as a unit to the input terminal I5, and data on the channels ch11 and ch12 is outputted as a unit to the input terminal I6.

×2 Speed Playback

An example where 1× speed playback is carried out has been described above. Next, an example where data recorded at 1× speed is played back at 2× speed is described. In the case where video data played back at 2× speed is transmitted as an HD-SDI signal, a LINK-A HD-SDI transmitter and a LINK-B HD-SDI transmitter that comply to dual-link HD-SDI as standardized in SMPTE 372M (see SMPTE 372M PROPOSED SMPTE STANDARD for Television—Dual LINK 292M Interface for 1920×1080 Picture Raster) are required.

SUMMARY OF THE INVENTION

Figure 6:
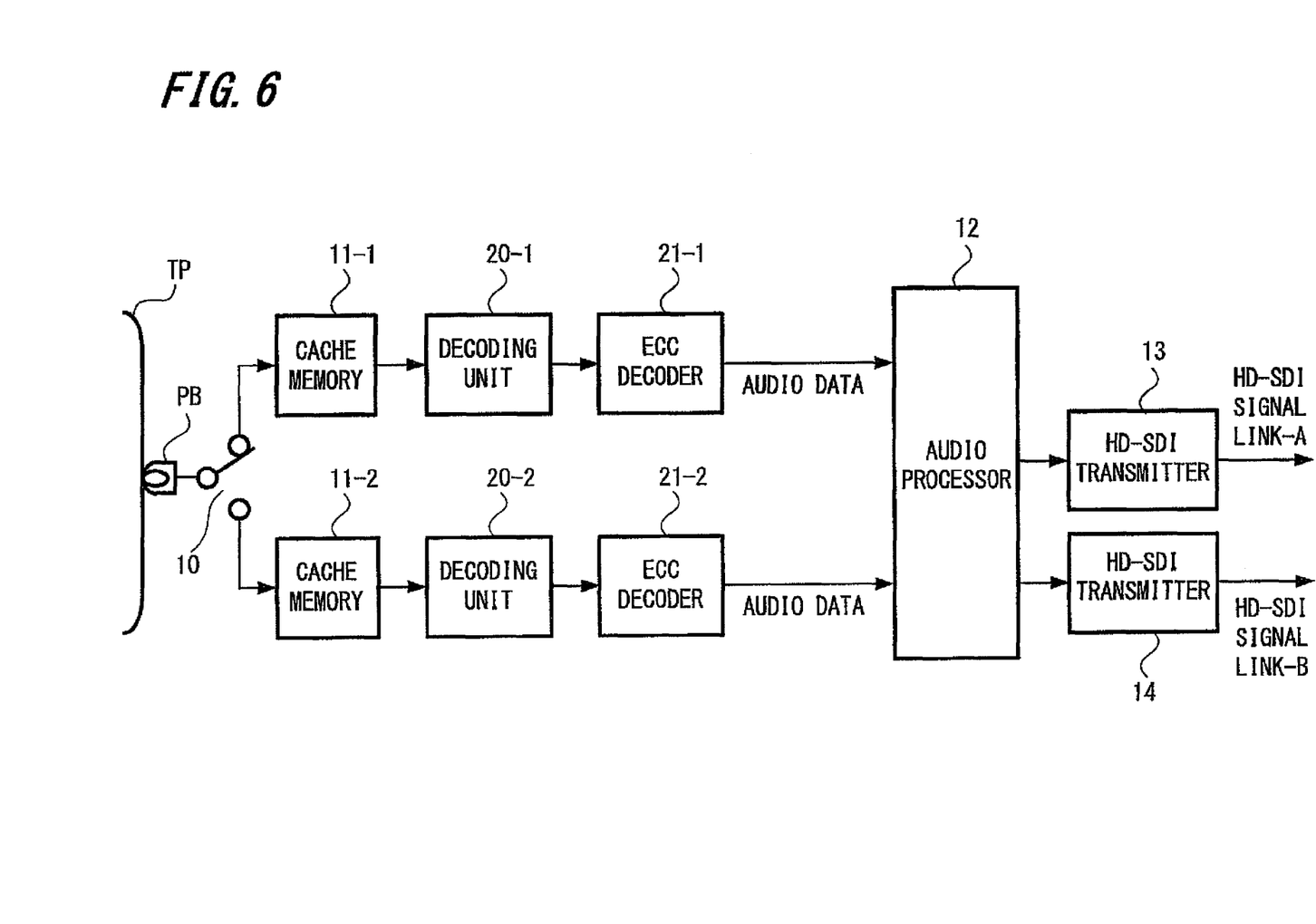
FIG. 6 is a block diagram showing an audio data output system when playing back data at 2× speed.

FIG. 6 is a block diagram showing an output system for audio data in an HDCAM®-format VTR in the case where video data with a field frequency of 59.94 Hz is played back at 2× speed and transmitted as an HD-SDI signal. Parts of this system that are the same as in the configuration shown in FIG. 3 described above have been assigned the same reference numerals.

The rotational speed of a rotating drum (not shown) that drives a magnetic tape TP is set at double the speed during 1× speed playback. The signal read out from the magnetic tape TP at 2× speed by the playback head PB is divided by a switch 10 into signals from recording tracks for data in odd-numbered fields ("picture1" and "audio1(800)", "picture3" and "audio3(801)", and "picture5" and "audio5(801)" shown in FIGS. 1 and 2 described above) and signals from recording tracks for data in even-numbered fields ("picture2" and "audio2(801)" and 'picture4' and "audio4(801)" shown in FIGS. 1 and 2 described above) and such signals are written into a cache memory 11-1 and a cache memory 11-2.

The signals written into the cache memories 11-1, 11-2 are converted into 1× speed signals by reading the signals from the cache memories 11-1, 11-2 at one half of the rate used when writing the signals.

The 1× speed signals from the cache memories 11-1, 11-2 are subjected to wave-shaping and decoding processes in decoding units 20-1, 20-2 respectively (the configuration of such decoding units is the same as the decoding unit 20 shown in FIG. 3), and are then subjected to error correction in ECC decoders 21-1, 21-2 respectively (the configuration of such decoders is the same as the ECC decoder 21 shown in FIG. 3).

Audio data that has been subjected to error correction is outputted from the ECC decoders 21-1, 21-2 to an audio processor 12. By doing so, audio data that has been played back at 2× speed by playing back video data of odd-numbered fields and audio data corresponding thereto and video data of even-numbered fields and audio data corresponding thereto in parallel is sent to the audio processor 12.

During 2× speed playback, the amount of the audio data is equivalent to twenty-four channels, which is double the amount during 1× speed playback. Since only sixteen channels of audio data can be embedded in one HD-SDI signal, the audio processor 12 divides the audio data to be outputted to a LINK-A HD-SDI transmitter 13 and a LINK-B HD-SDI transmitter 14 that comply to dual-link HD-SDI.

Figure 7A:
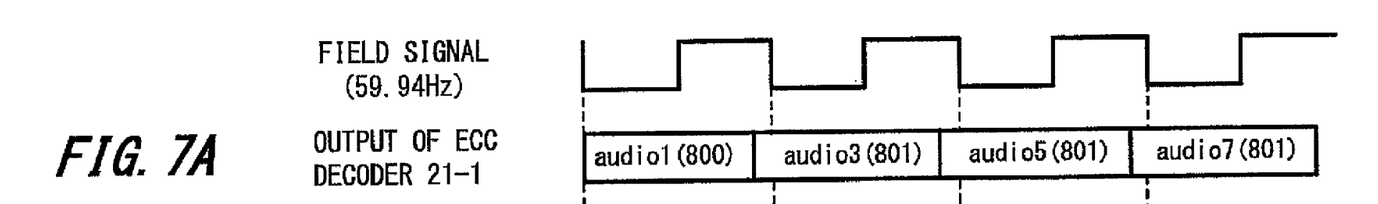
FIGS. 7A to 7D are diagrams showing audio data outputted from the ECC decoders and HD-SDI transmitters shown in FIG. 6.

FIGS. 7A to 7D show the audio data outputted from the ECC decoders 21-1, 21-2 and the audio data outputted from the HD-SDI transmitters 13, 14. As shown in FIG. 7A, audio data that corresponds to the video data in the odd-numbered fields, such as "audio1(800)", "audio3(801)", "audio5(801)", "audio7(801)", ... is outputted from the ECC decoder 21-1 to the audio processor 12.

Figure 7B:
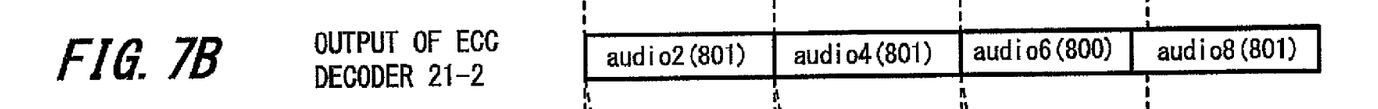

As shown in PIG. 7B, audio data that corresponds to the video data in the even-numbered fields, such as "audio2(801)", "audio4(801)", "audio6(801)", "audio8(801)", ... is outputted from the ECC decoder 21-2 to the audio processor 12 in parallel with the audio data from the ECC decoder 21-1.

The audio processor 12 outputs the audio data from the ECC decoder 21-1 to the HD-SDI transmitter 13 without changing the order and outputs the audio data from the ECC decoder 21-2 to the HD-SDI transmitter 14, again without changing the order.

Figure 7C:
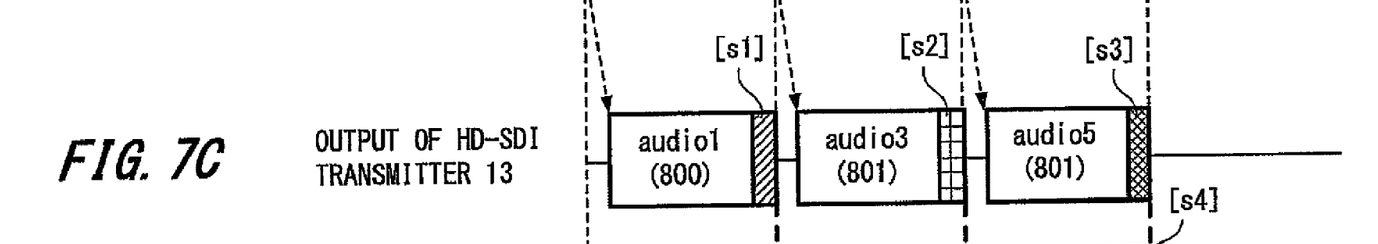

The HD-SDI transmitters 13, 14 embed a predetermined number of samples of audio data into the video data of each field. For example, if the predetermined number of samples is 801, as shown in FIG. 7C, "audio1(800)" is of 800 samples and short of one sample, and therefore the HD-SDI transmitter 13 takes one sample (that is, "[s1]" in FIG. 7C) from the start of "audio3(801)" and embeds a total of 801 samples in the video data to be outputted.

Next, since this results in "audio3(801)" having 800 samples that is short of one sample, one sample (that is, "[s2]" in FIG. 7C) is taken from the start of "audio5(801)" and a total of 801 samples are embedded in the video data to be outputted. Since this in turn results in "audio5(801)" having 800 samples that is short of one sample, one sample (that is, "[s3]" in FIG. 7C) is taken from the start of the next audio data (not shown) and a total of 801 samples are embedded in the video data to be outputted. The same processing is then repeated thereafter.

Figure 7D:
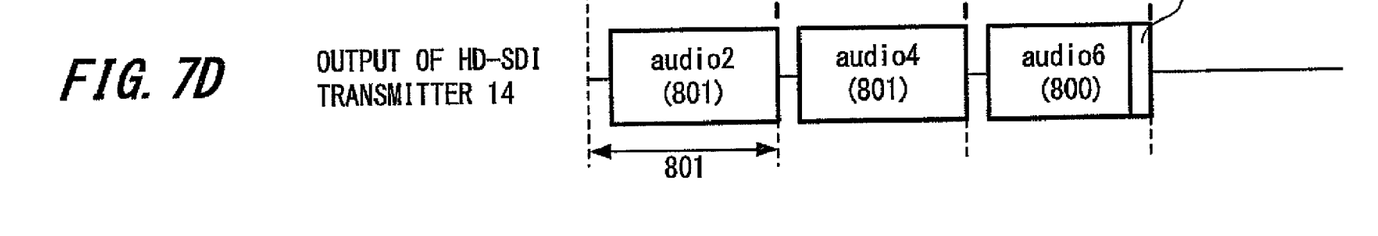

As shown in FIG. 7D, since "audio2(801)" and "audio4(801)" each have 801 samples, the HD-SDI transmitter 14 embeds such audio in the video data without adding a sample, but since the "audio6(800)" has 800 samples and is short of one sample, one sample (that is, "[s4]"in FIG. 7D) is taken from the start of the next audio data (not shown) and a total of 801 samples are embedded in the video data to be outputted. The same processing is then repeated thereafter.

However, if dual-link HD-SDI signals in which audio data has been embedded in this way are outputted from the HD-SDI transmitters 13, 14, an apparatus that receives the dual-link HD-SDI signals (for example, a video server used in a program production system) may not be able to reconstitute audio data that is consecutive in the original order.

Figure 8:
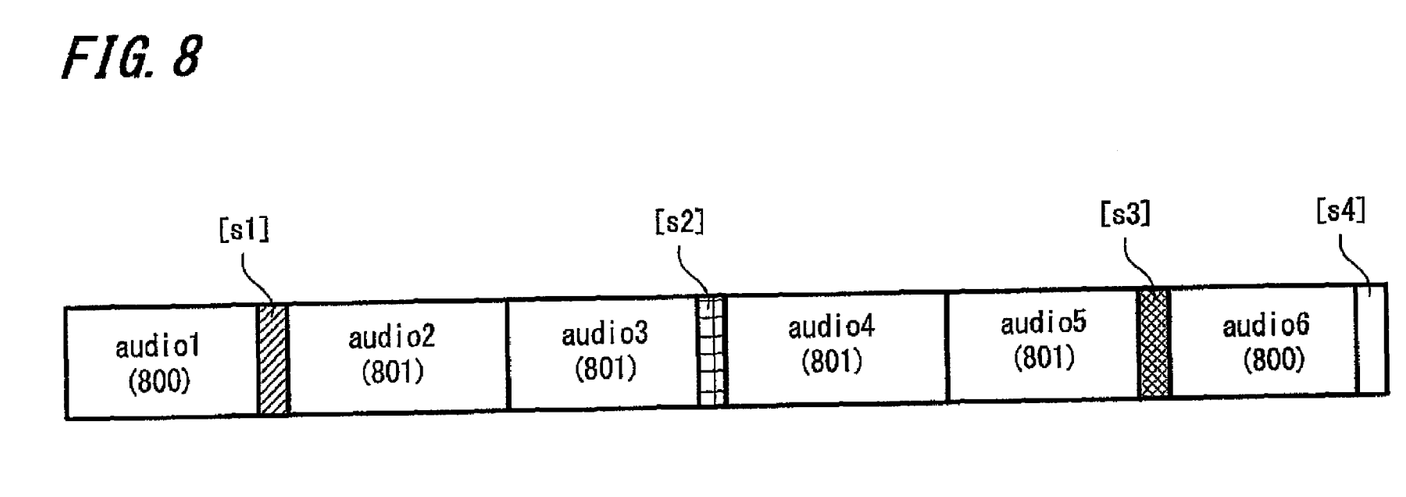
FIG. 8 is a diagram showing the audio data reconstituted in a receiving apparatus from the output of the HD-SDI transmitters shown in FIG. 7.

FIG. 8 shows the audio data reconstituted in a receiving apparatus from the output of the HD-SDI transmitters 13, 14. At the receiving apparatus, audio data is reconstituted by alternately arranging the audio data outputted from a LINK-A HD-SDI receiver and the audio data outputted from a LINK-B HD-SDI receiver. However, the audio data reconstituted in this way includes one sample [s1] (that is the same as [s1] shown in FIG. 7C) from the start of "audio3(801)" between "audio1(800)" and "audio2(801)", one sample [s2] (that is the same as [s2] shown in FIG. 7C) from the start of "audio5(801)" between "audio3(801)" and "audio4 (801)", . . . . Therefore, the reconstituted data has samples that are not in order of time and is not consecutive in the original order.

It is desirable to easily reconstitute audio data consecutive in the original order in a receiving apparatus, when a HDCAM SR® format VTR plays back video data with a field frequency of 59.94 Hz at 2× speed and transmits data as a dual-link HD-SDI signal.

According to an embodiment of the present invention, there is provided a data output apparatus. The data output apparatus includes: a playback unit and an audio processing unit. The playback unit plays back data at 2× speed from a tape-shaped recording medium, on which is recorded video data with a field frequency of 59.94 Hz and n channels (where n is an integer in a range of 9 to 16 ,inclusive) of audio data with a sampling frequency of 48 kHz where out of five consecutive fields, 800 samples are recorded corresponding to one field and 801 samples are recorded corresponding to each of the remaining four fields. Accordingly, the playback unit plays back video data in odd-numbered fields and audio data corresponding thereto and video data in even-numbered fields and audio data corresponding thereto in parallel. The audio processing unit writes the audio data corresponding to the odd-numbered fields and the audio data corresponding to the even-numbered fields played back in parallel by the playback unit into a memory, reads out the audio data from the memory at 96 kHz in order of the corresponding fields, and outputs the audio data to dual-link HD-SDI transmitters.

According to an embodiment of the present invention, there is provided a data output method. The data output method includes the steps of:

playing back data at 2× speed from a tape-shaped recording medium, on which is recorded video data with a field frequency of 59.94 Hz and n channels (where n is an integer in a range of 9 to 16 , inclusive) of audio data with a sampling frequency of 48 kHz where out of five consecutive fields, 800 samples are recorded corresponding to one field and 801 samples are recorded corresponding to each of the remaining four fields, by playing back video data in odd-numbered fields and audio data corresponding thereto and video data in even-numbered fields and audio data corresponding thereto in parallel;

writing the audio data corresponding to the odd-numbered fields and the audio data corresponding to the even-numbered fields played back in parallel in the data playback step into a memory and reading out the audio data from the memory at 96 kHz in order of the corresponding fields; and outputting the audio data read out from the memory in the writing and reading step to dual-link HD-SDI transmitters.

The data output apparatus and data output method according to an embodiment of the present invention play back data at 2× speed by playing back audio data corresponding to odd-numbered fields and audio data corresponding to even-numbered fields out of n channels (where n is an integer in a range of 9 to 16 , inclusive) of audio data with a sampling frequency of 48 kHz in parallel corresponding to video data with a field frequency of 59.94 Hz. Subsequently, such audio data is written in a memory, and the audio data is read from the memory at 96 kHz in order of the corresponding fields. After this, the audio data read from the memory is outputted to dual-link HD-SDI transmitters.

Accordingly, audio data consecutive in the original order is outputted to the dual-link HD-SDI transmitters in the same way as shown in FIG. 4B that relates to playing back data at 1× speed.

By doing so, when a HDCAM SR® format VTR plays back video data with a field frequency of 59.94 Hz at 2× speed and transmits the video data as a dual-link HD-SDI signal, it is possible for a receiver to easily reconstitute audio data consecutive in the original order.

DESCRIPTION OF THE PREFERRED EMBODIMENTS

Figure 9:
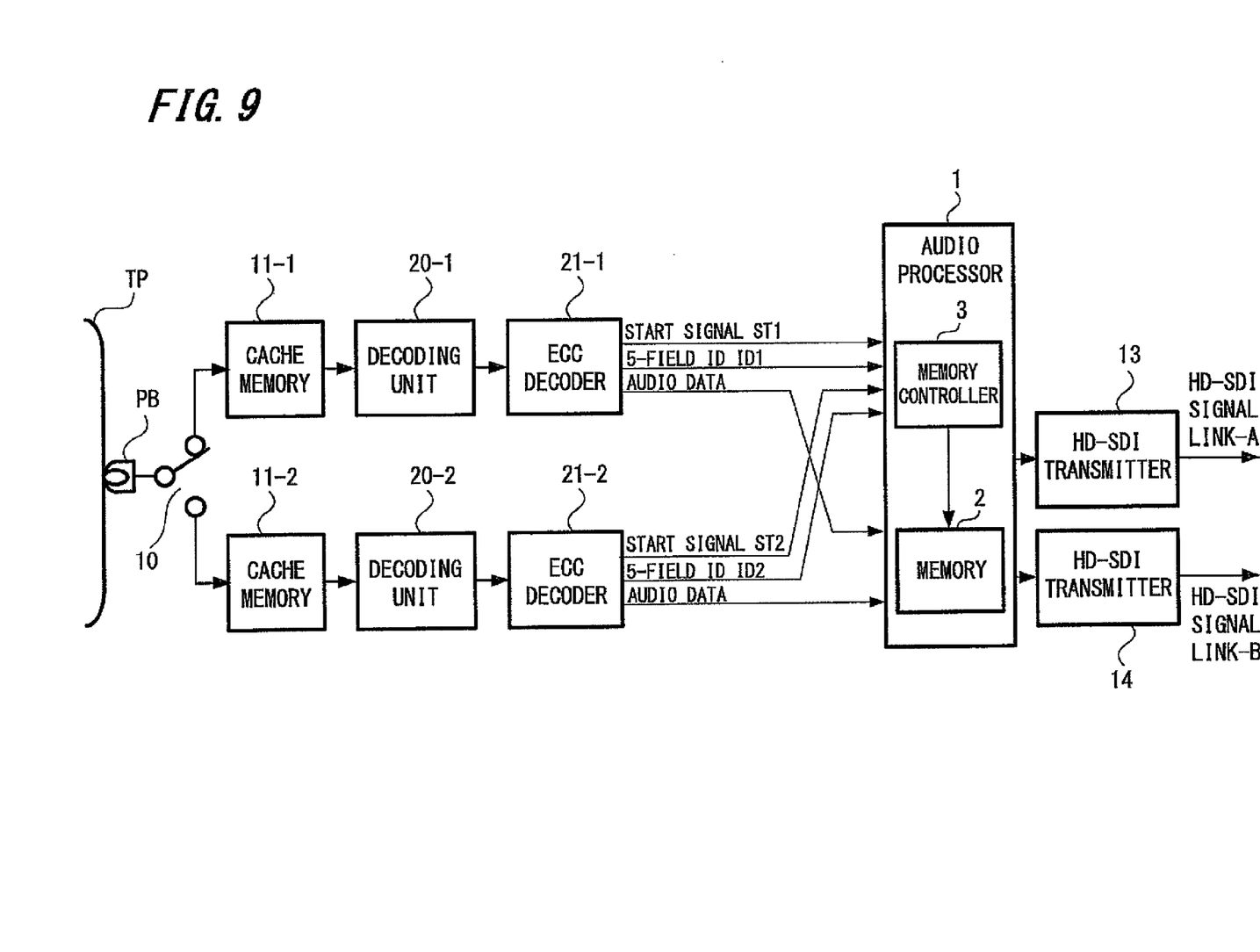
FIG. 9 is a block diagram showing an audio data output system for 2× speed playback according to an embodiment of the present invention.

Preferred embodiments of the present invention will now be described with reference to the attached drawings. FIG. 9 is a block diagram showing an output system for audio data when playing back data at 2× speed in an HDCAM SR® format VTR according to an embodiment of the present invention. Parts that are the same as in the configuration shown in FIG. 6 described above have been assigned the same reference numerals.

The rotational speed of a rotating drum (not shown) that drives a magnetic tape TP is set at double the speed during playback at 1× speed. The signal read out from the magnetic tape TP at 2× speed by a playback head PB is divided at a switch 10 into signals from recording tracks for data in odd-numbered fields ("picture1" and "audio1(800)", "picture3" and "audio3(801)", and "picture5" and "audio5(801)" shown in FIGS. 1 and 2 described above) and signals from recording tracks for data in even-numbered fields ("picture2" and "audio2(801)", and "picture4" and "audio4(801)" shown in FIGS. 1 and 2 described above) and such signals are written into a cache memory 11-1 and a cache memory 11-2, respectively.

The signals written into the cache memories 11-1, 11-2 are converted into 1× speed signals by reading the signals from the cache memories 11-1, 11-2 at one half of the rate used when writing the signals.

The 1× speed signals from the cache memories 11-1, 11-2 are subjected to wave-shaping and decoding processes in decoding units 20-1, 20-2, respectively, and are then subjected to error correction in ECC decoders 21-1, 21-2, respectively.

Audio data that has been subjected to error correction is outputted from the ECC decoders 21-1, 21-2 to an audio processor 1. By doing so, audio data that has been played back at 2× speed by playing back video data of odd-numbered fields and audio data corresponding thereto and video data of even-numbered fields and audio data corresponding thereto in parallel is sent to the audio processor 1.

Start signals ST1, ST2 (i.e., signals showing the start of data in each field) read from start positions of the recording tracks for data in each field and "5-field" IDs (that is, IDs that identify whether the number of samples in the audio data is 800 or 801) ID1, ID2 read out from positions before the recording positions of audio data on the recording tracks for the data in each field are also outputted from the ECC decoders 21-1, 21-2 to the audio processor 1.

The audio processor 1 includes a memory 2 and a memory controller 3 that controls the memory 2. The memory controller 3 uses the start signals ST1, ST2 and the "5-field" IDs ID1, ID2 to generate the write addresses used when writing audio data from the ECC decoders 21-1, 21-2 into the memory 2 and writes the audio data from the ECC decoders 21-1, 21-2 into the regions with such write addresses.

FIGS. 10A to 10H show the write addresses in the memory 2 generated by the memory controller 3. During a given field period EC1, after the start signal ST1 (see FIG. 10A) has been sent from the ECC decoder 21-1, when a "5-field" ID ID1 (see FIG. 10B) with the value 0 is sent from the ECC decoder 21-1, write addresses 0 to 799 (see FIG. 10D) for writing audio data "audio1(800)" (see FIG. 10C) with 800 samples from the ECC decoder 21-1 are generated.

Also, during the given field period FC1, after the start signal ST2 (see FIG. 10E) has been sent from the ECC decoder 21-2, when a "5-field" ID ID2 (see FIG. 10F) with the value 1 is sent from the ECC decoder 21-2, write addresses 800 to 1600 (see FIG. 10H) for writing audio data "audio2(801)" (see FIG. 10G) with 801 samples from the ECC decoder 21-2 are generated.

Subsequently, during the next field period FC2, after the start signal ST1 (see FIG. 10A) has been sent from the ECC decoder 21-1, when a "5-field" ID ID1 (see FIG. 10B) with the value 2 is sent from the ECC decoder 21-1, write addresses 1601 to 2401 (see FIG. 10D) for writing audio data "audio3(801)" (see FIG. 10C) with 801 samples from the ECC decoder 21-1 are generated.

Also, during the given field period FC2, after the start signal ST2 (see FIG. 10E) has been sent from the ECC decoder 21-2, when a "5-field" ID ID2 (see FIG. 10F) with the value 3 is sent from the ECC decoder 21-2, write addresses 2402 to 3202 (see FIG. 10H) for writing audio data "audio4(801)" (see FIG. 10G) with 801 samples from the ECC decoder 21-2 are generated.

Subsequently, during the next field period FC3, after the start signal ST1 (see FIG. 10A) has been sent from the ECC decoder 21-1, when a "5-field" ID ID1 (see FIG. 10B) with the value 4 is sent from the ECC decoder 21-1, write addresses 3203 to 4003 (see FIG. 10D) for writing audio data "audio5(801)" (see FIG. 10C) with 801 samples from the ECC decoder 21-1 are generated.

Also, during the given field period FC3, after the start signal ST2 (see FIG. 10E) has been sent from the FCC decoder 21-2, when a "5-field" ID 1D2 (see FIG. 10F) with the value 0 is sent from the ECC decoder 21-2, write addresses 4004 to 4803 (see FIG. 10H) for writing audio data "audio6(800)" (see FIG. 10G) with 800 samples from the ECC decoder 21-2 are generated.

Subsequently, during the next field period FC4, after the start signal ST1 (see FIG. 10A) has been sent from the ECC decoder 21-1, when a "5-field" ID ID1 (see FIG. 10B) with the value 1 is sent from the ECC decoder 21-1, write addresses 4804 to 5604 (see FIG. 10D) for writing audio data "audio7(801)" (see FIG. 10C) with 801 samples from the ECC decoder 21-1 are generated.

Also, during the given field period FC4, after the start signal ST2 (see FIG. 10E) has been sent from the ECC decoder 21-2, when a "5-field" ID ID2 (see FIG. 10F) with the value 2 is sent from the ECC decoder 21-2, write addresses 5605 to 6405 (see FIG. 10H) for writing audio data "audio8 (801)" (see FIG. 10G) with 801 samples from the ECC decoder 21-2 are generated.

After this, the same processing is repeated. By doing so, consecutive audio data "audio1(800)", "audio2(801)", "audio3(801)", "audio4(801)" "audio5(801)", "audio6 (800)", "audio7(801)" "audio8(801)", . . . are written into the regions 0 to 799, 800 to 1600, 1601 to 2401, 2402 to 3202, 3203 to 4003, 4004 to 4803, 4804 to 5604, 5605 to 6405, . . . representing consecutive write addresses in the memory 2.

The memory controller 3 reads the audio data that was written into the memory 2 as described above at double (that is, 96 kHz) the rate during writing to the memory 2 in order of the fields corresponding to generated consecutive read addresses 0 to 799, 800 to 1600, 1601 to 2401, 2402 to 3202, 3203 to 4003, 4004 to 4803, 4804 to 5604, 5605 to 6405, . . . .

Figures 10A, 10B, 10C:
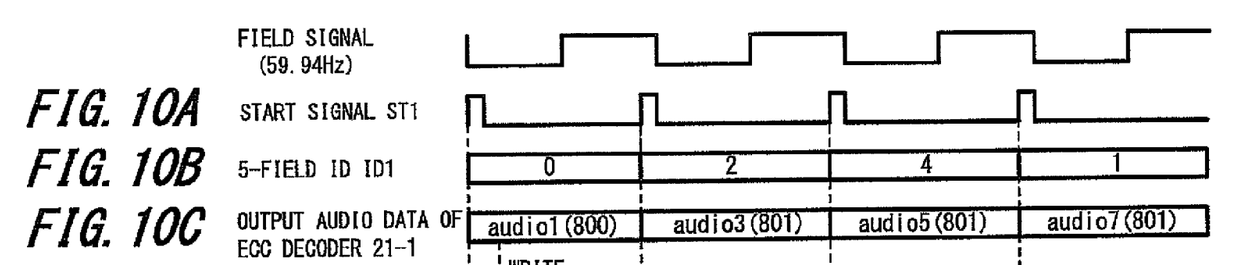
FIGS. 10A to 10J are diagrams showing write addresses and read addresses for a memory shown in FIG. 9.
Figure 10D:
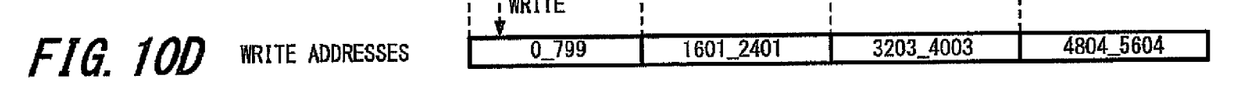
Figure 10E:
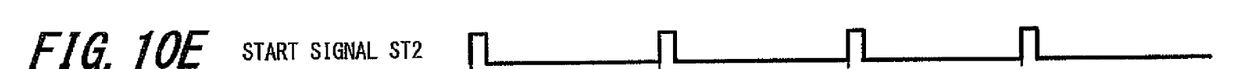
Figure 10F:
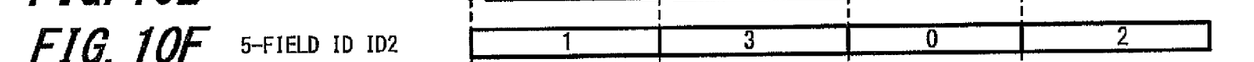
Figure 10G:
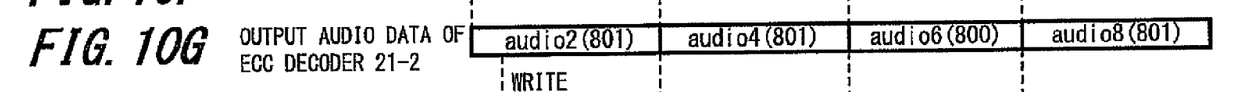
Figure 10H:
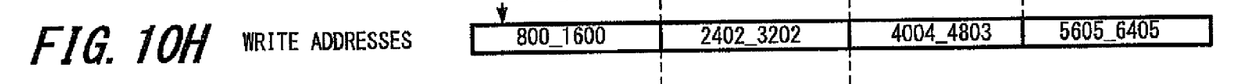
Figure 10I:
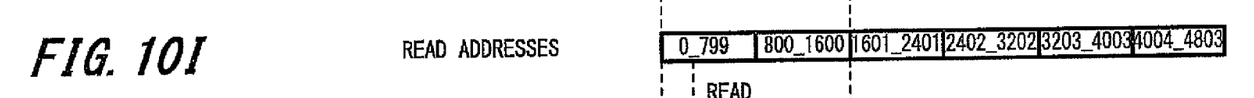
Figure 10J:
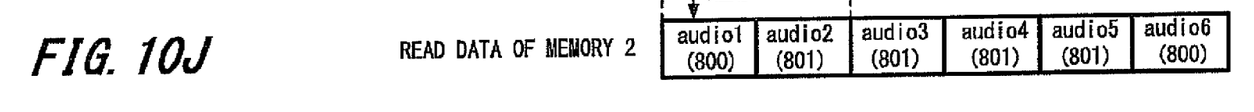

FIGS. 10I and 10J are diagrams showing the read addresses and data read from the memory 2. Audio data with a sampling frequency of 96 kHz that is consecutive in the original order, that is, "audio1(800)", "audio2(801)", "audio3(801)", "audio4(801)", "audio5(801)", "audio6(800)", . . . is read out.

Figure 11:
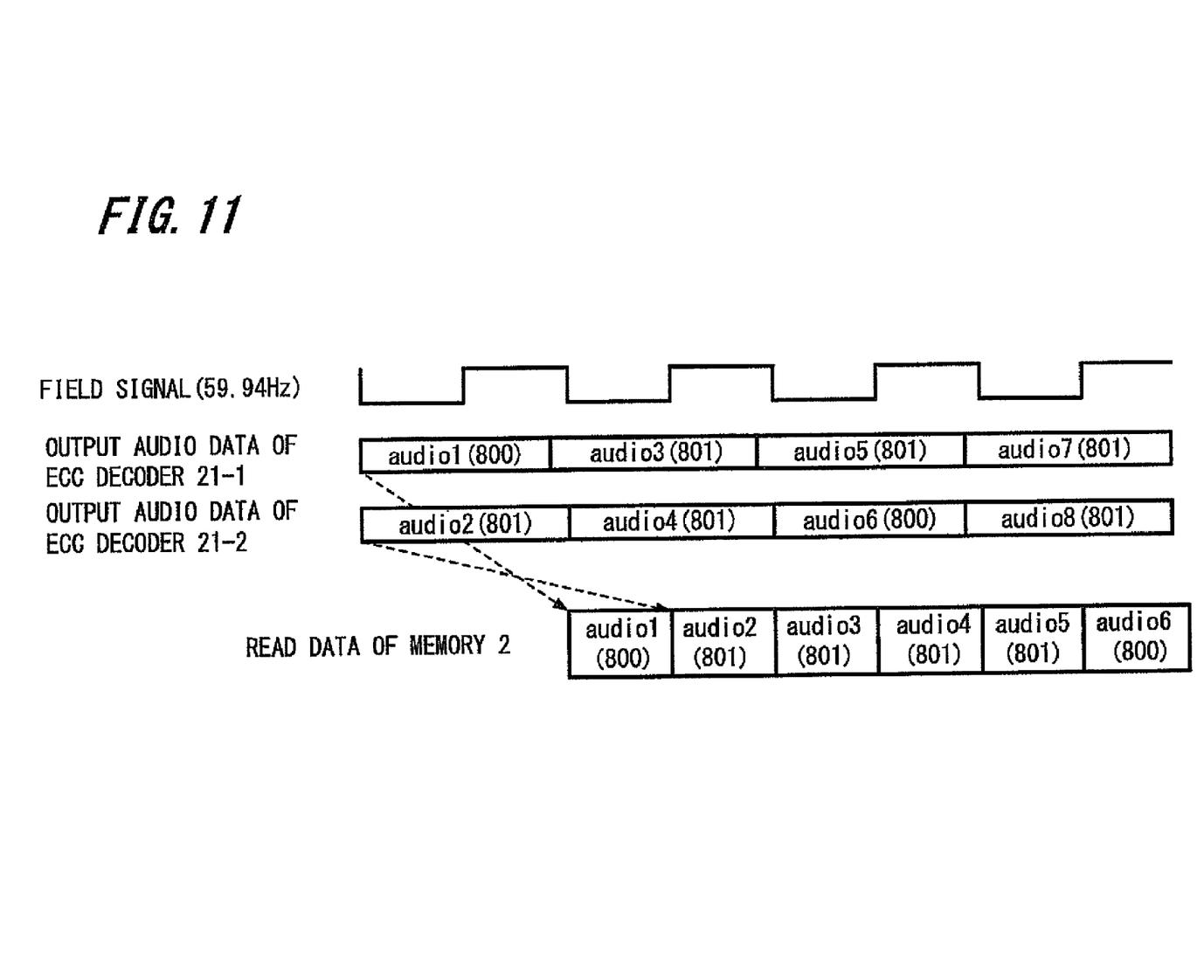
FIG. 11 is a diagram showing the relationship between the audio data outputted from the ECC decoders shown in FIG. 9 and the audio data read from the memory shown in FIG. 9.

FIG. 11 shows the relationship between the audio data outputted from the ECC decoders 21-1, 21-2 and the audio data read out from the memory 2 by illustrating FIGS. 10C, 10G, and 10J out of FIGS. 10A to 10J. In spite of the audio data corresponding to the odd-numbered fields and the audio data corresponding to the even-numbered fields being outputted in parallel from the ECC decoders 21-1, 21-2, audio data that is arranged so as to be consecutive in the original order is read out from the memory 2 (however, such audio data has double the sampling rate at 96 kHz).

The audio processor 1 outputs such audio data to the HD-SDI transmitters 13, 14 in the order of "audio1(800)", "audio2(801)", "audio3(801)", "audio4(801)", "audio5 (801)", "audio6(800)", . . . .

Figure 12:
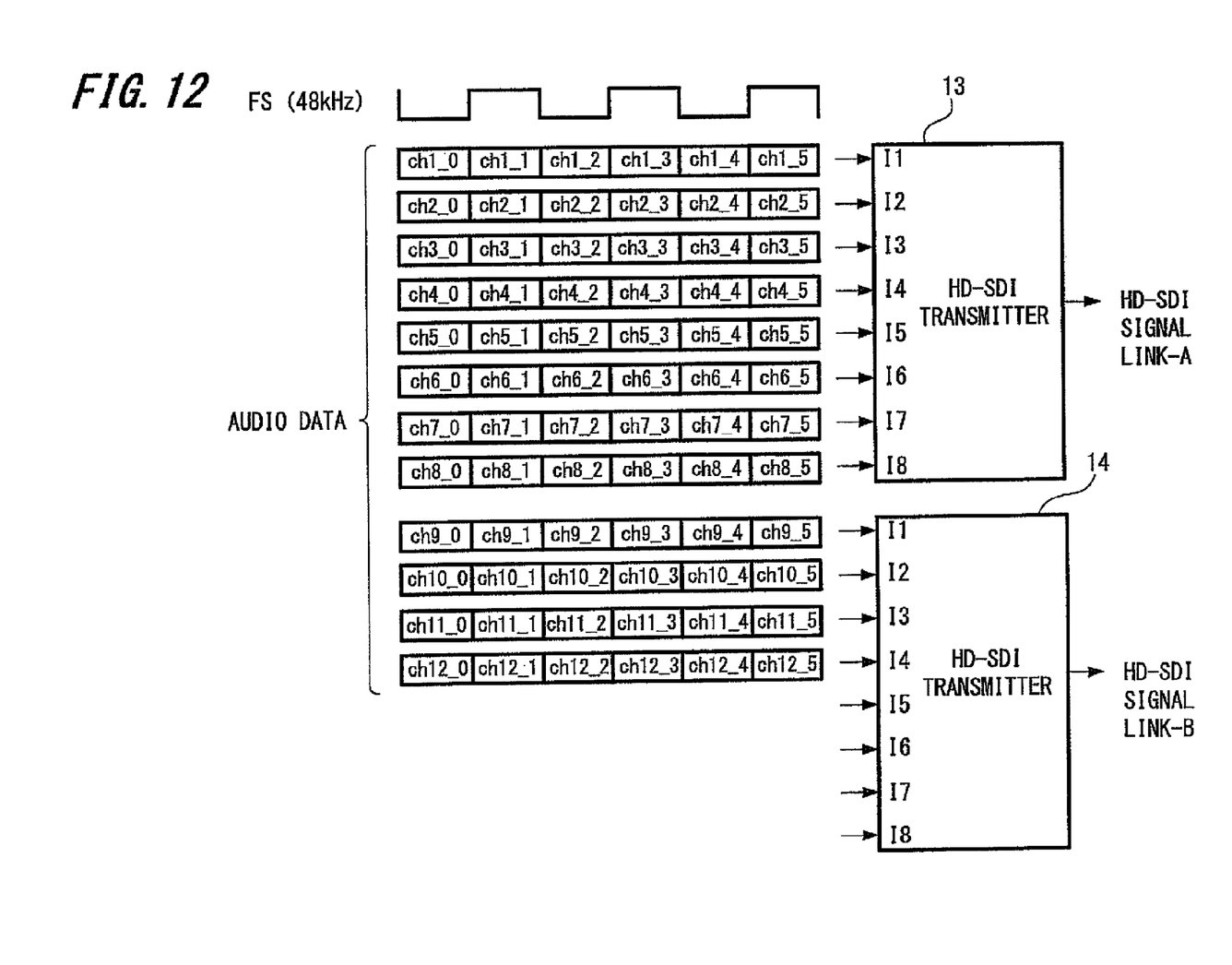
FIG. 12 is a diagram showing details of the channels of audio data outputted from the audio processor shown in FIG. 9.

FIG. 12 shows details of the channels of audio data outputted from the audio processor 1. Here, it is possible to embed audio data for sixteen channels in each of the LINK-A and LINK B HD-SDI signals. The HD-SDI transmitters 13, 14 are each provided with eight input terminals I1 to I8 for inputting sixteen channels of audio data. However, since the audio data outputted from the audio processor 1 has double the data amount due to the sampling frequency of 96 kHz, the number of channels that can be embedded in the LINK-A and LINK B HD-SDI signals is half of such number, i.e., eight.

Out of the audio data read out from the memory 2, the audio processor 1 outputs data on a same channel out of the first channel to the eighth channel consecutively to the input terminals I1 to I8 of the HD-SDI transmitter 13 and outputs data on a same channel out of the ninth channel to the twelfth channel consecutively to the input terminals I1 to I4 out of the input terminals I1 to I8 of the HD-SDI transmitter 14.

That is, in a given sampling period SC1, the audio processor 1 outputs the following audio data to the input terminals I1 to I8 of the HD-SDI transmitter 13 and the input terminals I1 to I4 of the HD-SDI transmitter 14.

ch1_0 that is part of the data on channel ch1 and ch1_1 that is data following thereafter are outputted to the input terminal I1 of the HD-SDI transmitter 13.

ch2_0 that is part of the data on channel ch2 and ch2_1 that is data following thereafter are outputted to the input terminal I2 of the HD-SDI transmitter 13.

ch3_0 that is part of the data on channel ch3 and ch3_1 that is data following thereafter are outputted to the input terminal I3 of the HD-SDI transmitter 13.

ch4_0 that is part of the data on channel ch4 and ch4_1 that is data following thereafter are outputted to the input terminal I4 of the HD-SDI transmitter 13.

ch5_0 that is part of the data on channel ch5 and ch5_1 that is data following thereafter are outputted to the input terminal I5 of the HD-SDI transmitter 13.

ch6_0 that is part of the data on channel ch6 and ch6_1 that is data following thereafter are outputted to the input terminal I6 of the HD-SDI transmitter 13.

ch7_0 that is part of the data on channel ch7 and ch7_1 that is data following thereafter are outputted to the input terminal I7 of the HD-SDI transmitter 13.

ch8_0 that is part of the data on channel ch8 and ch8_1 that is data following thereafter are outputted to the input terminal I8 of the HD-SDI transmitter 13.

ch9_0 that is part of the data on channel ch9 and ch9_1 that is data following thereafter are outputted to the input terminal I1 of the HD-SDI transmitter 14.

ch10_0 that is part of the data on channel ch10 and ch10_1 that is data following thereafter are outputted to the input terminal I2 of the HD-SDI transmitter 14.

ch11_0 that is part of the data on channel ch11 and ch11_1 that is data following thereafter are outputted to the input terminal I3 of the HD-SDI transmitter 14.

ch12_0 that is part of the data on channel ch12 and ch12_1 that is data following thereafter are outputted to the input terminal I4 of the HD-SDI transmitter 14.

In the next sampling period SC2, the audio processor 1 outputs the following audio data to the input terminals I1 to I8 of the HD-SDI transmitter 13 and the input terminals I1 to 14 of the HD-SDI transmitter 14.

data ch1_2 that follows data ch1_1 on channel ch1 and data ch1_3 that follows thereafter are outputted to the input terminal I1 of the HD-SDI transmitter 13.

data ch2_2 that follows data ch2_1 on channel ch2 and data ch2_3 that follows thereafter are outputted to the input terminal I2 of the HD-SDI transmitter 13.

data ch3_2 that follows data ch3_1 on channel ch3 and data ch3_3 that follows thereafter are outputted to the input terminal I3 of the HD-SDI transmitter 13.

data ch4_2 that follows data ch4_1 on channel ch4 and data ch4_3 that follows thereafter are outputted to the input terminal I4 of the HD-SDI transmitter 13.

data ch5_2 that follows data ch5_1 on channel ch5 and data ch5_3 that follows thereafter are outputted to the input terminal I5 of the HD-SDI transmitter 13.

data ch6_2 that follows data ch6_1 on channel ch6 and data ch6_3 that follows thereafter are outputted to the input terminal I6 of the HD-SDI transmitter 13.

data ch7_2 that follows data ch7_1 on channel ch7 and data ch7_3 that follows thereafter are outputted to the input terminal I7 of the HD-SDI transmitter 13.

data ch8_2 that follows data ch_1 on channel ch8 and data ch8_3 that follows thereafter are outputted to the input terminal I8 of the HD-SDI transmitter 13.

data ch9_2 that follows data ch9_1 on channel ch9 and data ch9_3 that follows thereafter are outputted to the input terminal I1 of the HD-SDI transmitter 14.

data ch10_2 that follows data ch10_1 on channel ch10 and data ch10_3 that follows thereafter are outputted to the input terminal I2 of the HD-SDI transmitter 14.

data ch11_2 that follows data ch11_1 on channel ch11 and data ch11_3 that follows thereafter are outputted to the input terminal I3 of the HD-SDI transmitter 14.

data ch12_2 that follows data ch12_1 on channel ch12 and data ch12_3 that follows thereafter are outputted to the input terminal I4 of the HD-SDI transmitter 14.

Subsequently, in the same way, audio data on the channels ch1 to ch8 is consecutively outputted in each sampling period to the input terminals I1 to I8 respectively of the HD-SDI transmitter 13 and audio data on the channels ch9 to ch12 is consecutively outputted in each sampling period to the input terminals I1 to I4 respectively of the HD-SDI transmitter 14.

In this way, audio data consecutive in the original order is outputted to the HD-SDI transmitters 13, 14 from the audio data output system in the same way as shown in FIG. 4B where data is played back at 1× speed.

By doing so, an apparatus that receives dual-link HD-SDI signals outputted from the HD-SDI transmitters 13, 14 (for example, a video server used in a program production system) will be able to easily reconstitute audio data consecutive in the original order. Note that the sampling frequency of the audio data can be reconstituted from 96 kHz to 48 kHz as necessary using a memory or the like provided for such receiving apparatus.

According to an embodiment of the present invention, the rotational speed of the rotating drum is doubled compared to playback of data at 1× speed. The signal read out at 2× speed from the magnetic tape TP is divided using the switch 10 into a signal for odd-numbered fields and a signal for even-numbered fields, and the cache memories 11-1, 11-2 convert the signals to a 1× speed signal, thereby playing back data at 2× speed. Alternatively, it is also possible to keep the rotational speed of the rotating drum at the same speed as during 1× speed playback, to double the number of playback heads, and to simultaneously read a signal for odd-numbered fields with one playback head and a signal for even-numbered fields with another playback head.

According to an embodiment of the present invention, HDCAM SR® format is used. However, other VTR formats than HDCAM SR® format can be used similarly as long as video data is recorded with a field frequency of 59.94 Hz and n channels (where n is an integer in a range of 9 to 16, inclusive) of audio data with a sampling frequency of 48 kHz is recorded so that out of five consecutive fields, 800 samples correspond to one field and 801 samples correspond to the remaining four fields.

It should be understood by those skilled in the art that various modifications, combinations, sub-combinations and alterations may occur depending on design requirements and other factors insofar as they are within the scope of the appended claims or the equivalents thereof.

What is claimed is:

1. A data output apparatus, comprising:
a playback unit configured to play back data at 2× speed from a tape-shaped recording medium, on which has been recorded video data with a field frequency of 59.94 Hz and n channels of audio data with a sampling frequency of 48 kHz, where n is an integer in a range of 9 to 16, inclusive, and where out of five consecutive fields of the video data, one field corresponds to 800 samples of the audio data and each of four remaining fields corresponds to 801 samples of the audio data and where the playback unit is configured to play back the data at 2× speed by playing back odd-numbered fields of the video data and samples of the audio data corresponding thereto in parallel with even-numbered fields of the video data and samples of the audio data corresponding thereto; and
an audio processing unit configured to:
write the samples of the audio data corresponding to the odd-numbered fields and the samples of the audio data corresponding to the even-numbered fields played back in parallel into a memory,
read out the samples of the audio data from the memory at 96 kHz in order of the corresponding fields, and
output the audio data read out from the memory to dual-link HD-SDI transmitters.

2. The data output apparatus according to claim 1, wherein the audio processing unit is configured to output the audio data read out from the memory to the dual-link HD-SDI transmitters by outputting samples of a channel of the audio data to an input of the dual-link HD-SDI transmitters in a consecutive order.

3. The data output apparatus according to claim 1, wherein the audio processing unit is configured to output the audio data read out from the memory to the dual-link HD-SDI transmitters by:
outputting samples of 8 of the channels of the audio data to 8 respective inputs of a LINK-A transmitter of the dual-link HD-SDI transmitters, the samples of each of the 8 channels of the audio data being output in a consecutive order, and
outputting samples of n-8 remaining channels of the audio data to n-8 respective inputs of a LINK-B transmitter of the dual-link HD-SDI transmitters, the samples of each of the n-8 channels of the audio data being output in a consecutive order.

4. The data output apparatus according to claim 2, wherein:
the one field of video data is recorded on the recording medium such that video data of the one field is divided into a start region and an end region, the number of channels of audio data (n) is 12, and the 12 channels of the audio data corresponding to the one field are recorded consecutively between the start region and the end region, and
the audio processing unit is configured to output the audio data read out from the memory to the dual-link HD-SDI transmitters by:
outputting samples of 8 of the channels of the audio data to 8 respective inputs of a LINK-A transmitter of the dual-link HD-SDI transmitters, the samples of each of the 8 channels of the audio data being output in a consecutive order, and
outputting samples of four remaining channels of the audio data to four respective inputs of a LINK-B transmitter of the dual-link HD-SDI transmitters, the samples of each of the four channels of the audio data being output in a consecutive order.

5. A data output method, comprising:
playing back data at 2× speed from a tape-shaped recording medium, on which has been recorded video data with a field frequency of 59.94 Hz and n channels of audio data with a sampling frequency of 48 kHz, where n is an integer in a range of 9 to 16, inclusive, and where out of five consecutive fields of the video data, one field corresponds to 800 samples of the audio data, and each of four remaining fields corresponds to 801 samples of the audio data, and where playing back the data at 2× speed comprises playing back odd-numbered fields of the video data and audio data corresponding thereto in parallel with even-numbered fields of the video data and audio data corresponding thereto;
writing the samples of the audio data corresponding to the odd-numbered fields and the samples of the audio data corresponding to the even-numbered fields played back in parallel into a memory;
reading out the samples of the audio data from the memory at 96 kHz in order of the corresponding fields; and
outputting the audio data read out from the memory in the writing and reading stop to dual-link HD-SDI transmitters.

6. The data output method according to claim 5, wherein outputting the audio data read out from the memory to the dual-link HD-SDI transmitters comprises outputting samples of a channel of the audio data to an input of the dual-link HD-SDI transmitters in a consecutive order.

7. The data output method according to claim 6, wherein outputting the audio data read out from the memory to the dual-link HD-SDI transmitters comprises:
outputting samples of 8 of the channels of the audio data to 8 respective inputs of a LINK-A transmitter of the dual-link HD-SDI transmitters, the samples of each of the 8 channels of the audio data being output in a consecutive order, and
outputting samples of n-8 remaining channels of the audio data to n-8 respective inputs of a LINK-B transmitter of the dual-link HD-SDI transmitters, the samples of each of the n-8 channels of the audio data being output in a consecutive order.

8. The data output method according to claim 6, wherein:
the one field of video data is recorded on the recording medium such that video data of the one field is divided into a start region and an end region, the number of channels of audio data (n) is 12, and the 12 channels of the audio data corresponding to the one field are recorded consecutively between the start region and the end region, and
outputting the audio data read out from the memory to the dual-link HD-SDI transmitters comprises:
outputting samples of 8 of the channels of the audio data to 8 respective inputs of a LINK-A transmitter of the dual-link HD-SDI transmitters, the samples of each of the 8 channels of the audio data being output in a consecutive order, and outputting samples of four remaining channels of the audio data to four respective inputs of a LINK-B transmitter of the dual-link HD-SDI transmitters, the samples of each of the four channels of the audio data being output in a consecutive order.

9. The data output apparatus according to claim 1, wherein the audio processing unit is configured to output the audio data read out from the memory to the dual-link HD-SDI transmitters by outputting first samples of the audio data to a first transmitter of the dual-link HD-SDI transmitters and outputting second samples of the audio data to a second transmitter of the dual-link HD-SDI transmitters, the first samples and the second samples corresponding to a first field of the video data.

10. The data output apparatus according to claim 1, wherein the playback unit is further configured to play back the data at 2× speed by reading the video data from the recording medium at a rate of 880 Mbps.

11. The data output apparatus according to claim 1, wherein the playback unit is further configured to play back the data at 2× speed by reading the video data from the recording medium at a second rate, the video data having been recorded to the recording medium at a first rate, the second rate being twice the first rate.

12. The data output apparatus according to claim 1, wherein the tape-shaped recording medium comprises a magnetic tape.

13. The data output method according to claim 5, wherein outputting the audio data read out from the memory to the dual-link HD-SDI transmitters comprises outputting first samples of the audio data to a first transmitter of the dual-link HD-SDI transmitters and outputting second samples of the audio data to a second transmitter of the dual-link HD-SDI transmitters, the first samples and the second samples corresponding to a first field of the video data.

14. The data output method according to claim 5, wherein playing back the data at 2× speed further comprises reading the video data from the recording medium at a rate of 880 Mbps.

15. The data output method according to claim 5, wherein playing back the data at 2× speed further comprises reading the video data from the recording medium at a second rate, the video data having been recorded to the recording medium at a first rate, the second rate being twice the first rate.

16. The data output method according to claim 5, wherein the tape-shaped recording medium comprises a magnetic tape.

17. An audio processing apparatus configured for use in a data output apparatus, the data output apparatus comprising a playback unit configured to play back data at 2× speed from a tape-shaped recording medium on which has been recorded video data with a field frequency of 59.94 Hz and n channels of audio data with a sampling frequency of 48 kHz, n being an integer greater than or equal to 9 and less than or equal to 16, the video data comprising fields, a first field of the fields corresponding to 800 samples of the audio data, and each of a second, third, fourth, and fifth field of the fields corresponding to 801 respective samples of the audio data, the data output apparatus being configured to play back the data at 2× speed by playing back the first field of the video data and samples of the audio data corresponding thereto in parallel with the second field of the video data and samples of the audio data corresponding thereto, the audio processing apparatus comprising:
an audio processing unit configured to:
write the samples of the audio data corresponding to the odd-numbered fields and the samples of the audio data corresponding to the even-numbered fields played back in parallel into a memory,
read out the audio data from the memory at 96 kHz in order of the corresponding fields, and
output the audio data read out from the memory to dual-link HD-SDI transmitters.

18. The audio processing apparatus according to claim 17, wherein the audio processing unit is configured to output the audio data read out from the memory to the dual-link HD-SDI transmitters by outputting samples of a channel of the audio data to an input of the dual-link HD-SDI transmitters in a consecutive order.

19. The audio processing apparatus according to claim 17, wherein the audio processing unit is configured to output the audio data read out from the memory to the dual-link HD-SDI transmitters by:
outputting samples of 8 of the channels of the audio data to 8 respective inputs of a LINK-A transmitter of the dual-link HD-SDI transmitters, the samples of each of the 8 channels of the audio data being output in a consecutive order, and
outputting samples of remaining n-8 channels of the audio data to n-8 respective inputs of a LINK-B transmitter of the dual-link HD-SDI transmitters, the samples of each of the n-8 channels of the audio data being output in a consecutive order.

20. The audio processing apparatus according to claim 17, wherein:
the one field of video data is recorded on the recording medium such that video data of the one field is divided into a start region and an end region, the number of channels of audio data (n) is 12, and the 12 channels of the audio data corresponding to the one field are recorded consecutively between the start region and the end region, and
the audio processing unit is configured to output the audio data read out from the memory to the dual-link HD-SDI transmitters by:
outputting samples of 8 of the channels of the audio data to 8 respective inputs of a LINK-A transmitter of the dual-link HD-SDI transmitters, the samples of each of the 8 channels of the audio data being output in a consecutive order, and
outputting samples of four remaining channels of the audio data to four respective inputs of a LINK-B transmitter of the dual-link HD-SDI transmitters, the samples of each of the four channels of the audio data being output in a consecutive order.

21. The audio processing apparatus according to claim 17, wherein the audio processing unit is configured to output the audio data read out from the memory to the dual-link HD-SDI transmitters by outputting first samples of the audio data to a first transmitter of the dual-link HD-SDI transmitters and outputting second samples of the audio data to a second transmitter of the dual-link HD-SDI transmitters, the first samples and the second samples corresponding to a first field of the video data.

22. The audio processing apparatus according to claim 17, wherein the playback unit is further configured to play back the data at 2× speed by reading the video data from the recording medium at a rate of 880 Mbps.

23. The audio processing apparatus according to claim 17, wherein the playback unit is further configured to play back the data at 2× speed by reading the video data from the recording medium at a second rate, the video data having been recorded to the recording medium at a first rate, the second rate being twice the first rate.

24. The audio processing apparatus according to claim 17, wherein the tape-shaped recording medium comprises a magnetic tape.

* * * * *